July 5, 1927.
A. STRAND
MILK BOTTLE COVER
Filed Aug. 24, 1925
1,634,806
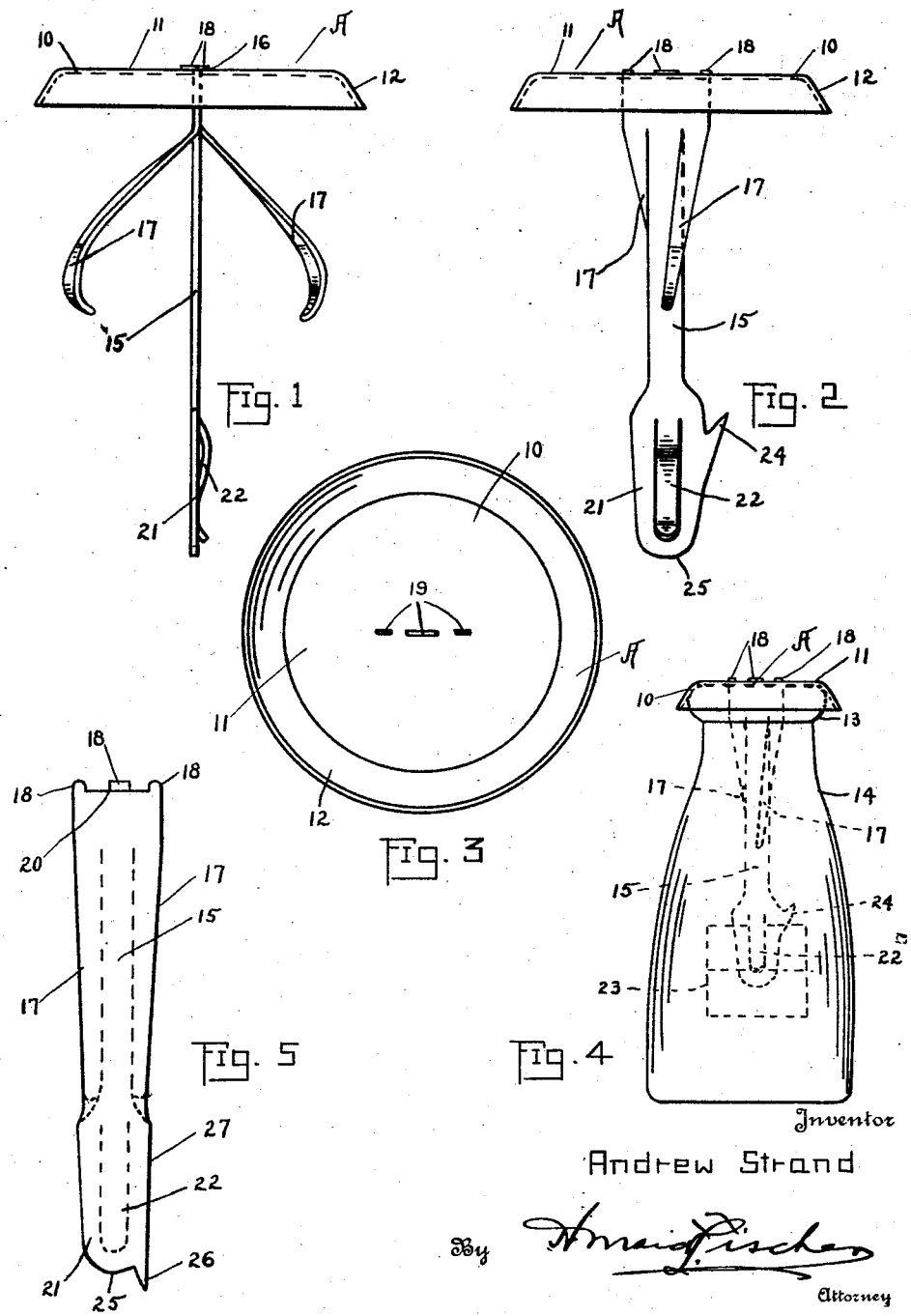
Inventor
Andrew Strand
By H. L. Fischer
Attorney Patented July 5, 1927.

1,634,806

UNITED STATES PATENT OFFICE.

ANDREW STRAND, OF MINNEAPOLIS, MINNESOTA.

MILK-BOTTLE COVER.

Application filed August 24, 1925. Serial No. 51,958.

My invention relates to milk bottle covers wherein it is desired to provide means for covering the empty milk bottle and to include means for holding the tickets or memorandum slips for the milk man within the bottle so that the cover protects the holder and prevents the tickets from getting wet, even though the empty milk bottle stands outside where it is exposed to moisture.

A feature of the invention resides in a cover having a depending side so as to project over the rim of the bottle in the top of the neck, and prevent any moisture from entering the milk bottle when the cover is over the same.

It is also a feature of my invention to provide spring means for holding the cover attached to the bottle so that it cannot be accidentally pushed off or disengaged even though the bottle should be tipped over. This spring holding means permits the cover to be snapped over the neck of the bottle or to be removed when desired.

A further object of the invention resides in means for associating with the cover means for holding the tickets or any memorandum slip directing the milk man so that he may be informed as to just what the customer desires. This ticket holding means is adapted to support the tickets within the bottle, protected from rain and moisture and prevent the tickets from getting damp by concealing them within the bottle, yet holding them off of the bottom of the bottle so that they will not get wet or freeze to the bottom of the bottle. It is quite annoying to the milk man to have the tickets dropped into the bottle, as they are not easily removed therefrom. This form of ticket holding means prevents the tickets from blowing away and holds them in ready access so that the milk man can more easily remove them by the cover holder when the same is removed from the bottle.

The invention includes means for removing the paper stopper disks from the milk bottle which is formed on the edge of the ticket holder in a manner so that the edgewise rigidity of the holder provides a stopper remover with a piercing end and with the necessary strength and rigidity to easily remove the milk bottle cap when it is desired. In this manner the utility of my milk bottle cover is increased by the association of elements which are adapted to operate together to provide a utility for household use.

Other features and objects of my invention will be more fully set forth in the specification and claims.

In the drawings forming part of my specification:

Figure 1 is a side view of my milk bottle cover showing the holding means in edgewise position.

Figure 2 is also a side view of my cover showing the flat side of the holding means.

Figure 3 is a plan view of the cover.

Figure 4 illustrates my cover attached to a milk bottle as it would appear in use.

Figure 5 illustrates an alternative formation of a portion of my milk bottle cover in an enlarged detail.

In the drawings my milk bottle cover A is formed with a cover portion 10 having a flat top 11 with an outwardly flaring depending side wall 12, which is adapted to cover the rim and project over the rim 13 of the milk bottle 14 when the cover A is placed on the empty milk bottle.

The cover A is formed of metal or any other suitable material which may be of aluminum or other non-rusting or corrosive material if it is desired. Depending from and secured to the cover portion 10 I provide an arm 15 which is secured at 16 in any suitable manner, to the cover portion 10 and which is provided with oppositely disposed spring arm members 17 which are bent so as to engage within the neck of the milk bottle 14 to hold the cover A in place upon the bottle. In the blanking formation of the arm 15, the spring members 17 are formed from the same piece of metal with the arm 15, so that they extend integral from the same and in Figure 5 I illustrate the blanking formation of the arm 15, illustrating in dotted lines the cutting line in the formation of the spring members 17. This provides an economical means of manufacture, which is quite important in an article of this nature as most of these articles are designed to be manufactured and given away as an advertisement, the advertising being placed upon the cover portion 11 so as to be clearly displayed when the cover A is in use. This is also a feature of my device as it provides a very adaptable place for advertising matter unobstructed by any other parts.

The arm 15 is provided with ears 18 which are adapted to extend through the slots 19 in the cover portion 10, and when bent over hold the arm 15 depending centrally from the inner face of the cover A. The lugs 18 are spaced apart to provide a shoulder portion 20 which forms a stop for the arm 15 to rest against, the inner surface of the cover portion 10, providing a rigid construction.

The lower end of the arm 15 is formed with a plate like portion 21 in which a tongue 22 is cut which provides a spring tongue for engaging the tickets 23, as illustrated in Figure 4. When the tickets 23 are placed beneath the tongue 22 they are held against the plate 21 so as to prevent the tickets from being lost and holding the same concealed within the bottle 14 collectively supported, spaced from the bottom and in readiness so that milk man can easily remove the same from the plate 21 when the cover A is removed from the bottle.

It is very desirable to provide a means for opening a milk bottle and to facilitate this the plate 21 is provided with a cap piercing point 24 which projects away from the outer free end 25 of the plate 21 and is of a flat thin nature in conformity with the flat nature of the arm 15. The particular position of the cap piercing point 24 is important in that it projects away from the end 25. This permits the cap of the milk bottle to be readily removed by engaging the cover portion 10 of the cover A and pulling toward the operator while the piercing point 24 is pressed into the milk bottle cover, until sufficient grip is accomplished by the piercing point 24 to readily remove the cover. In operating my cover removing means in this manner the milk or cream will not be splashed over the operator and the cover can be easily lifted off in removing the same.

The piercing point for removing the cover can be placed on the outer free end 25, as I have illustrated by the point 26 in Figure 5, if it is desired, which permits the arm 15 to be made of a narrower strip of material and for economy this design may be used. The piercing point 26 can be forced straight into the milk bottle cover at and near the shoulder which holds the cover to the bottle, while the edge 27 of the arm 15 rests against one side of the rim 13 of the milk bottle. Thus the edge 27 provides means for prying against the same when the piercing point 26 has entered the cover of the bottle.

The cover removing means is of marked utility in the fact that it can be operated without bending the arm 15 owing to the strength of the flat edgewise operation of the piercing point 24 or 26 to open the milk bottle. In this manner I provide a very economical form and construction which is most adaptable to a milk bottle and thereby increasing the utility of my milk bottle cover as a household article.

In accordance with the patent statutes I have described the principles of operation of my milk bottle cover, and while I have illustrated a particular formation of the same in the drawings, I desire to have it understood that this is only suggestive as to the carrying out of my invention and the device may be varied and applied to uses other than those above set forth within the scope of the following claims.

I claim:

1. A closure for a milk bottle including, an arm depending from and supported by a cover member, a spring means formed integrally with said arm and projecting from the same to form a snap lock for holding the cover to the neck of a bottle and ticket holding means formed on the free end of said arm for the purpose specified.

2. A milk bottle cover ticket holding device, including, a cover member having flat center portion, a depending outwardly flaring side wall about said central portion, a flat arm extending from the inner side of said cover oppositely disposed spring tongue members formed integral with said arm and a flat like free end having a spring tongue adapted to form a ticket holding means on said arm to support milk tickets concealed and protected within an empty milk bottle, said spring tongues being adapted to hold said cover against free disengagement from the milk bottle.

ANDREW STRAND.